(12) United States Patent
Lee

(10) Patent No.: US 11,391,321 B2
(45) Date of Patent: Jul. 19, 2022

(54) BALL JOINT HOLDER WITH LIMITING ELEMENT

(71) Applicant: Cheng Uei Precision Industry Co., Ltd., New Taipei (TW)

(72) Inventor: Peng-Yuan Lee, New Taipei (TW)

(73) Assignee: CHENG UEI PRECISION INDUSTRY CO., LTD., New Taipei (TW)

( * ) Notice: Subject to any disclaimer, the term of this patent is extended or adjusted under 35 U.S.C. 154(b) by 989 days.

(21) Appl. No.: 16/121,587

(22) Filed: Sep. 4, 2018

(65) Prior Publication Data
US 2019/0120286 A1 Apr. 25, 2019

(30) Foreign Application Priority Data
Oct. 24, 2017 (TW) ................................ 106136569

(51) Int. Cl.
*F16C 11/06* (2006.01)
(52) U.S. Cl.
CPC ...... *F16C 11/0647* (2013.01); *F16C 11/0604* (2013.01); *F16C 11/0614* (2013.01); *F16C 11/0642* (2013.01); *Y10T 403/32573* (2015.01); *Y10T 403/32803* (2015.01)
(58) Field of Classification Search
CPC ............... G03B 17/561; F16C 11/0604; F16C 11/0614; F16C 11/0642; F16C 11/0647; F16C 11/0661; Y10T 403/32565; Y10T 403/32573; Y10T 403/32381; Y10T 403/32647; Y10T 403/32655; Y10T 403/32737; Y10T 403/32803

USPC ......... 403/114, 115, 116, 124, 125, 135, 143
See application file for complete search history.

(56) References Cited

U.S. PATENT DOCUMENTS

| | | | |
|---|---|---|---|
| 2,723,571 A * | 11/1955 | Koenig | H01H 23/146 403/114 |
| 6,341,915 B1 * | 1/2002 | Kammel | F16C 11/0652 403/135 |
| 6,413,003 B1 * | 7/2002 | Schmidt | F16C 11/0604 403/135 |
| 6,439,794 B2 * | 8/2002 | Schmidt | F16C 11/0647 403/135 |
| 6,676,325 B2 * | 1/2004 | Schmidt | B62D 7/16 403/135 |
| 7,083,356 B2 * | 8/2006 | Paduano | F16C 11/0647 403/138 |

(Continued)

FOREIGN PATENT DOCUMENTS

DE 8137469 U1 * 5/1982 .......... F16C 11/0647

*Primary Examiner* — Josh Skroupa
(74) *Attorney, Agent, or Firm* — Cheng-Ju Chiang

(57) ABSTRACT

A ball joint holder with limiting element includes a lower base, an upper base covered to the lower base, a ball shaft and a limiting element. The ball shaft has a rotation rod, and a ball body located around a lower end of the rotation rod. A lower end of the rotation rod protrudes outward to form a limiting block. Two opposite ends of the limiting element are pivotally connected with the lower base and the upper base. The limiting element opens a limiting groove. One of inner surfaces of a front wall and a rear wall of the limiting groove is defined as a limiting surface. The lower end of the rotation rod and the limiting block are received in the limiting groove. The limiting block is capable of abutting against the limiting surface.

15 Claims, 15 Drawing Sheets

(56) References Cited

U.S. PATENT DOCUMENTS 9,309,919 B2 * 4/2016 Staade ................ F16C 11/0642
9,464,663 B2 * 10/2016 Belleau ............... F16C 11/0638
9,845,823 B1 * 12/2017 Yaworsky ........... F16C 11/0642

\* cited by examiner

US 11,391,321 B2

1

BALL JOINT HOLDER WITH LIMITING ELEMENT

CROSS-REFERENCE TO RELATED APPLICATION

The present application is based on, and claims priority form, Taiwan Patent Application No. 106136569, filed Oct. 24, 2017, the disclosure of which is hereby incorporated by reference herein in its entirety.

BACKGROUND OF THE INVENTION

1. Field of the Invention

The present invention generally relates to a ball joint, and more particularly to a ball joint holder with a limiting element.

2. The Related Art

Referring to FIG. 11 to FIG. 13, a conventional ball joint holder with limiting element 100' is used for fastening a camera device (not shown). The conventional ball joint holder with limiting element 100' includes a lower ball base 10', an upper ball base 20' and a ball shaft 30'. A middle of a bottom surface of the lower ball base 10' is recessed inward to form a circular recess 11' seen from a bottom view. A lower portion of an inner surface of a sidewall of the recess 11' protrudes inward to form a first limiting block 12' projecting into the recess 11'. An upper end of the lower ball base 10' opens a lower assembling notch 13' penetrating through a middle of a top surface of the lower ball base 10'. The lower assembling notch 13' is corresponding to and communicated with the recess 11'. The upper ball base 20' is covered to the lower ball base 10'. A middle of a lower end of the upper ball base 20' opens an upper assembling notch 21' penetrating through a middle of a bottom surface of the upper ball base 20'. The upper assembling notch 21' is corresponding to the lower assembling notch 13'. An upper end of the upper ball base 20' opens an opening 22' penetrating through a top surface of the upper ball base 20'.

The ball shaft 30' has a rotation rod 31' extending up and down, and a ball portion 32' fastened to a lower portion of the rotation rod 31'. A bottom end of the rotation rod 31' protrudes sideward to form a second limiting block 33'. A lower portion of the ball portion 32' is assembled in the lower assembling notch 13'. The bottom end of the rotation rod 31' projects into the recess 11'. The first limiting block 12' and the second limiting block 33' are capable of protruding towards a same direction, namely the first limiting block 12' and the second limiting block 33' are capable of being towards a same side of the conventional ball joint holder with limiting element 100'. An upper portion of the ball portion 32' is assembled in the upper assembling notch 21'. A top end of the rotation rod 31' is received in the opening 22' and projects beyond the top surface of the upper ball base 20'. The camera device is fastened to the top end of the rotation rod 31'.

Referring to FIG. 11 to FIG. 15, when the camera device rotates towards a clockwise direction R1' or an anticlockwise direction R2', the rotation rod 31' rotates around an axis A1' of the rotation rod 31' and rotates towards the clockwise direction R1' or the anticlockwise direction R2'. The rotation rod 31' rotates towards the clockwise direction R1' or the anticlockwise direction R2' until the second limiting block 33' abuts against the first limiting block 12', at the moment,

2 a limiting point of the rotation rod 31' rotating towards the clockwise direction R1' or the anticlockwise direction R2' is a point of the second limiting block 33' abutting against the first limiting block 12'. In addition, when the camera device is inclined sideward, the rotation rod 31' pivots the ball portion 32' to be inclined. When the camera device rotates towards the clockwise direction R1' or the anticlockwise direction R2' in advance, and then the camera device is inclined sideward, the rotation rod 31' will rotate around the axis A1' of the rotation rod 31' and rotate towards the clockwise direction R1' or the anticlockwise direction R2' in advance, and then the rotation rod 31' pivots the ball portion 32' to be inclined sideward. When the camera device is inclined sideward and then rotates towards the clockwise direction R1' or the anticlockwise direction R2', the rotation rod 31' will pivot the ball portion 32' to be inclined, and then the rotation rod 31' rotates around the axis A1' of the rotation rod 31' and rotates towards the clockwise direction R1' or the anticlockwise direction R2'.

However, when the camera device is rotated in advance, and then the camera device proceeds being inclined, the rotation rod 31' is incapable of proceeding an effective inclination towards an arbitrary direction of which an angle is within 360 degrees. When the rotation rod 31' rotates to be inclined until the first limiting block 12' abuts against the second limiting block 33' to make the rotation rod 31' incapable of proceeding the effective inclination or get stuck. In addition, when the camera device is inclined sideward and then rotates towards the clockwise direction R1' or the anticlockwise direction R2', a position of the second limiting block 33' relative to the first limiting block 12' is changed on account of the rotation rod 31' being inclined, at the moment, a maximum angle of the rotation rod 31' rotating towards the clockwise direction R1' or the anticlockwise direction R2' is incapable of being a constant angle, namely, when the rotation rod 31' is inclined to different angles or different positions, maximum angles of the rotation rod 31' rotating towards the clockwise direction R1' and the anticlockwise direction R2' are different, so that when the camera device is inclined to the different angles or the different positions, the maximum angles of the camera device rotating towards the clockwise direction R1' and the anticlockwise direction R2' are different, a maximum rotation angle of one side of the camera device is incapable of satisfying usage needs of users.

Thus it is essential to provide an innovative ball joint holder with limiting element, a rotation rod of the innovative ball joint holder with limiting element is capable of being effectively inclined in an arbitrary direction of which an angle is within 360 degrees, when the rotation rod is inclined to different angles or different positions, a maximum rotation angle of the rotation rod rotating around an axis of the rotation rod and rotating towards a clockwise direction or an anticlockwise direction is a preset constant angle for satisfying usage needs of users.

SUMMARY OF THE INVENTION

An object of the present invention is to provide a ball joint holder with limiting element. The ball joint holder with limiting element includes a lower base, an upper base, a ball shaft and a limiting element. The lower base opens a recess penetrating through a middle of a bottom surface of the lower base, and a lower assembling notch penetrating through a middle of a top surface of the lower base. The lower assembling notch is corresponding to and communicated with the recess. The upper base is covered to the lower base. The upper base opens an upper assembling notch penetrating through a middle of a bottom surface of the upper base. The upper assembling notch is corresponding to the lower assembling notch. A top of the upper assembling notch extends upward to form a perforation. The ball shaft has a rotation rod extending up and down, and a ball body located around a lower end of the rotation rod. The lower end of the rotation rod protrudes outward to form a limiting block. A lower end of the ball body is assembled in the lower assembling notch. The lower end of the rotation rod projects into the recess. An upper end of the ball body is received in the upper assembling notch. An upper end of the rotation rod is received in the perforation and projects beyond a top surface of the upper base. The limiting element is received in the recess. Two opposite ends of the limiting element are pivotally connected with the lower base and the upper base, and the limiting element is capable of rotating forward and backward. The limiting element opens a limiting groove extending towards the two opposite ends of the limiting element. The limiting groove is corresponding to the lower assembling notch. One of inner surfaces of a front wall and a rear wall of the limiting groove is a plane and is defined as a limiting surface. The lower end of the rotation rod and the limiting block are received in the limiting groove. The limiting element is capable of rotating together with the ball shaft. The limiting block is capable of facing to and abutting against the limiting surface.

As described above, the ball joint holder with limiting element is equipped with the limiting element, the limiting element opens the limiting groove extending towards the two opposite ends of the limiting element, and the one of the inner surfaces of the front wall and the rear wall of the limiting groove is defined as the limiting surface, two ends of a lower end of the limiting surface project beyond two ends of an upper end of the limiting surface and two ends of an inner surface of a rear wall of the limiting groove, when the upper end of the rotation rod is inclined towards a left end or a right end of the limiting groove, the lower end of the rotation rod will slide towards a reverse direction opposite to the left end or the right end of the limiting groove in the limiting groove, when a camera device drives the upper end of the rotation rod to be inclined towards the other directions of the limiting groove different from the left end and the right end of the limiting groove, the limiting element is driven to rotate, so that the rotation rod is capable of proceeding an effective inclination in an arbitrary position of which an angle is within 360 degrees. In addition, when the rotation rod is inclined towards different angles or different positions, the limiting element rotates along with the rotation rod, the limiting surface and the limiting block keep in opposite positions, a maximum rotation angle of the rotation rod rotating towards a clockwise direction or an anticlockwise direction around an axis is capable of being set to a preset constant angle for satisfying usage needs of users.

BRIEF DESCRIPTION OF THE DRAWINGS

The present invention will be apparent to those skilled in the art by reading the following description, with reference to the attached drawings, in which.

DETAILED DESCRIPTION OF THE PREFERRED EMBODIMENT

Figure 1:
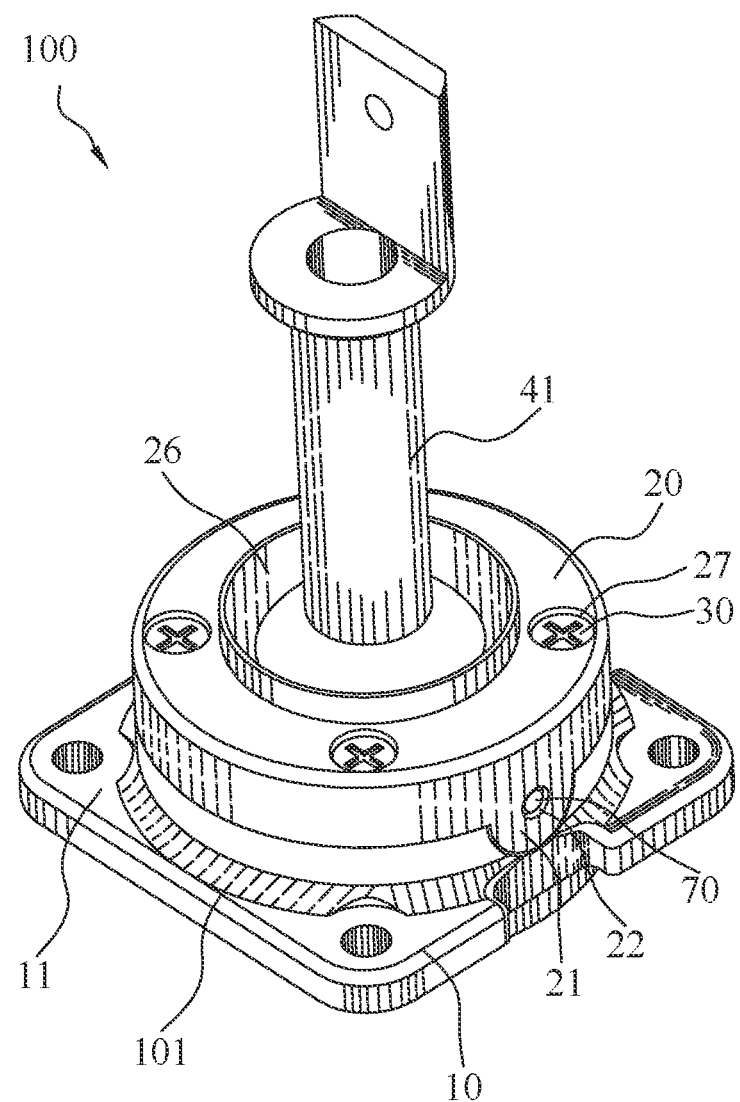
FIG. 1 is a perspective view of a ball joint holder with a limiting element in accordance with a first preferred embodiment of the present invention.
Figure 2:
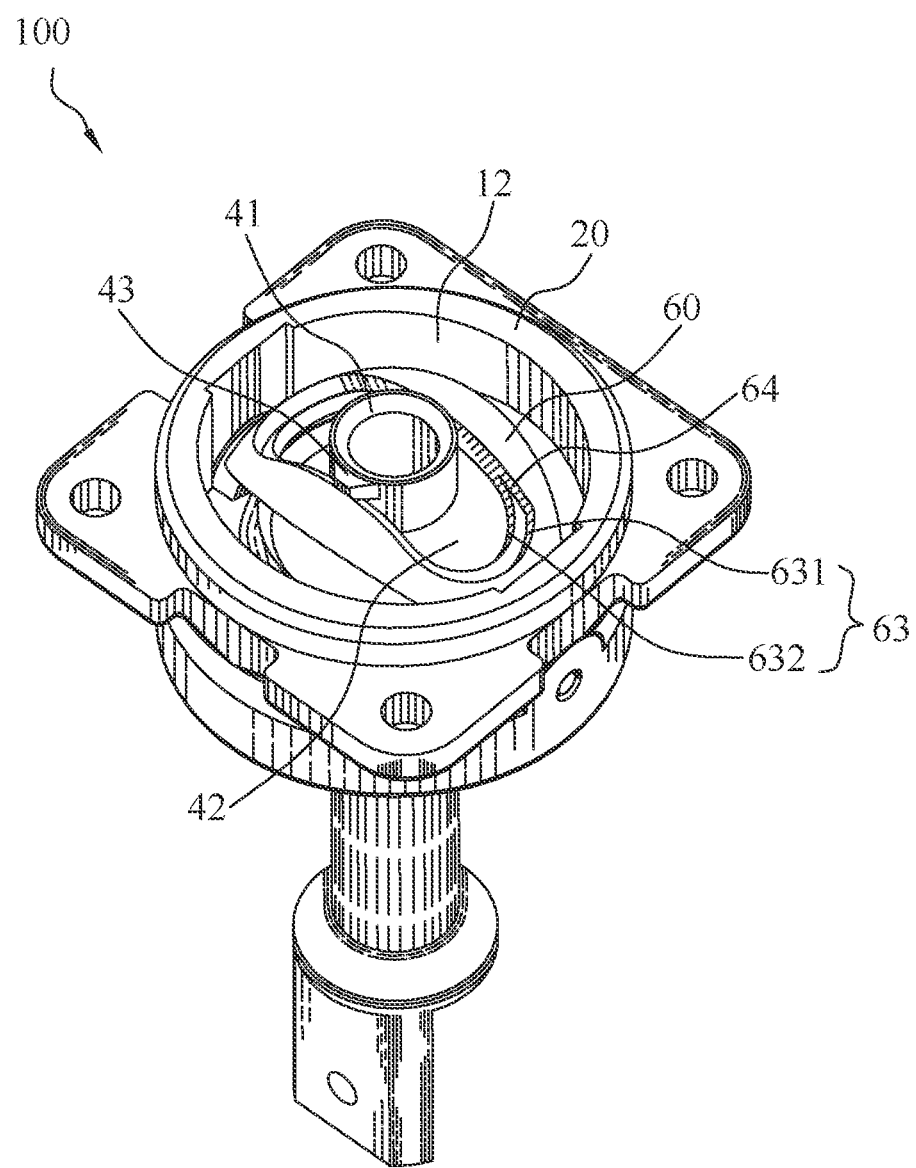
FIG. 2 is another perspective view of the ball joint holder with a limiting element of FIG. 1.
Figure 3:
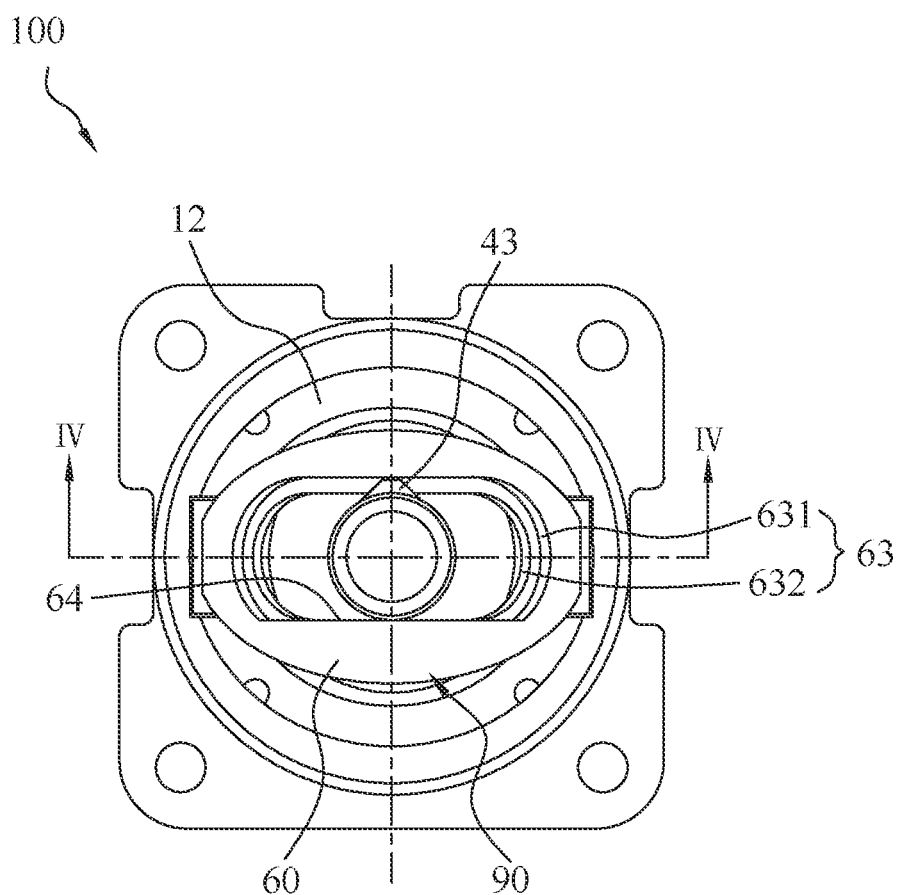
FIG. 3 is a top view of the ball joint holder with a limiting element of FIG. 1.

With reference to FIG. 1, FIG. 3, FIG. 4 and FIG. 7, a ball joint holder 100 with limiting element 90 in accordance with the present invention is shown. The ball joint holder 100 with a limiting element 90 is used for fixing a display screen device (not shown), a camera device 200 or etc. The ball joint holder 100 with a limiting element 90 in accordance with the present invention includes a lower base 10, an upper base 20, a plurality of fixing elements 30, a ball shaft 40, a wear-resisting element 50, a limiting element 90 and two bolts 70. In the first preferred embodiment, the ball joint holder with limiting element 100 is used for fastening the camera device 200. The limiting element 90 is a first limiting element 60.

Figure 6:
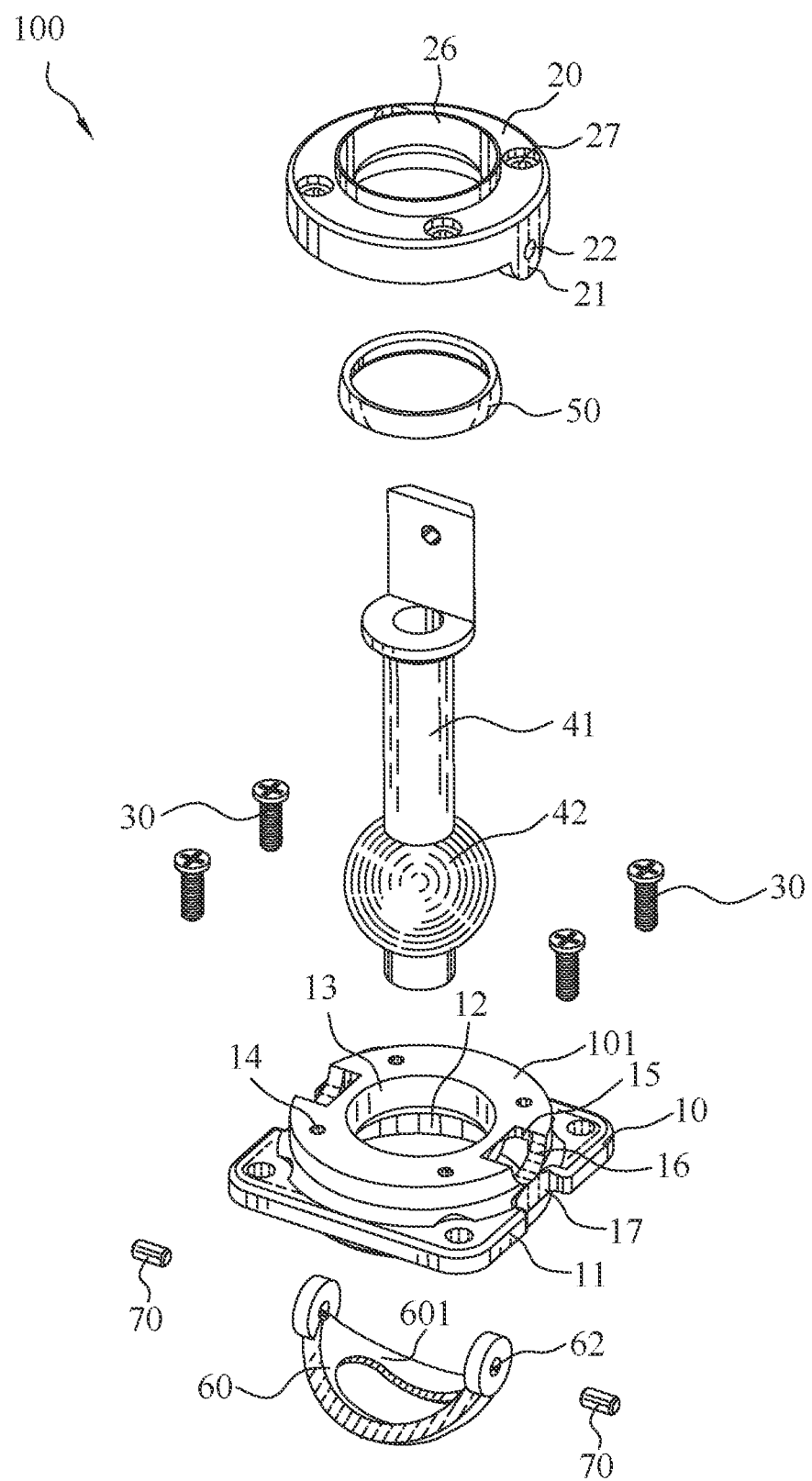
FIG. 6 is an exploded view of the ball joint holder with a limiting element of FIG. 1.
Figure 7:
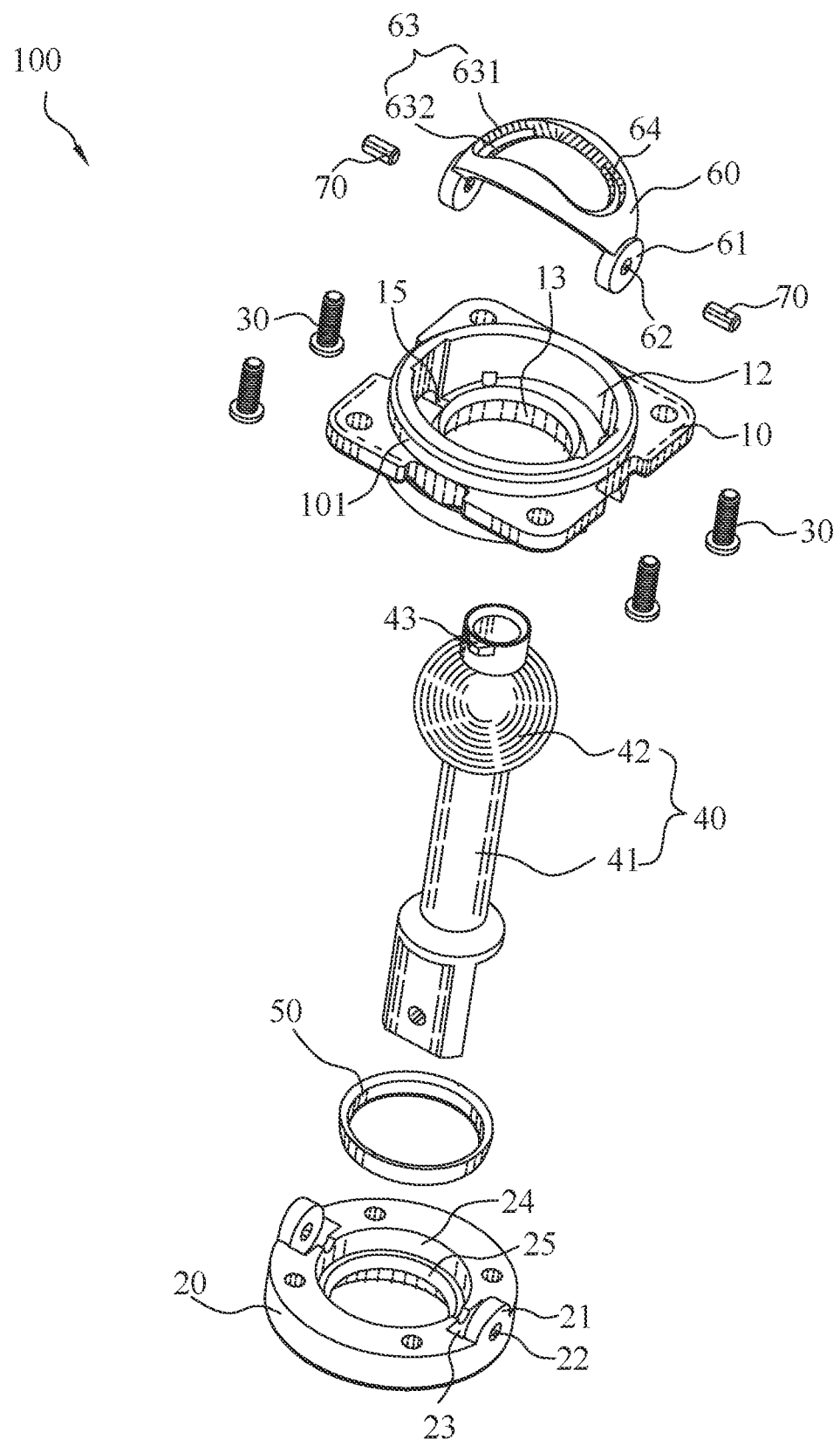
FIG. 7 is another exploded view of the ball joint holder with a limiting element of FIG. 1.
Figure 8:
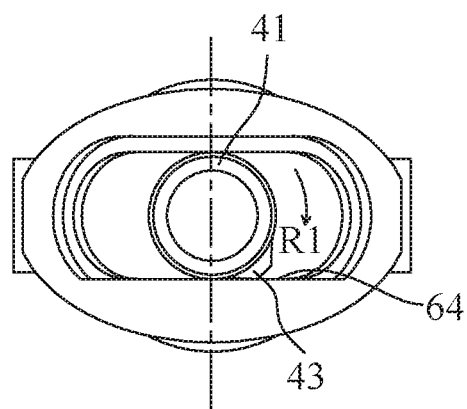
FIG. 8 is a schematic diagram of the ball joint holder with a limiting element in accordance with the present invention, wherein a rotation rod rotates around an axis and rotates towards a clockwise direction to a first limiting point.
Figure 9:
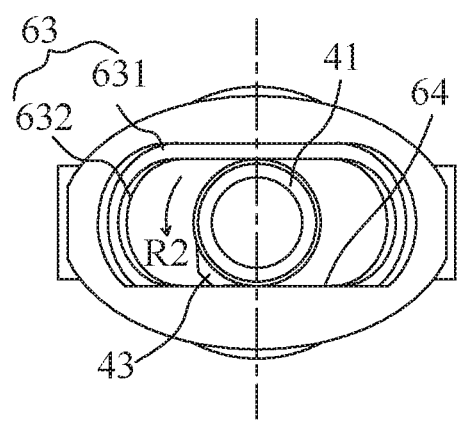
FIG. 9 is a schematic diagram of the ball joint holder with a limiting element in accordance with the present invention, wherein the rotation rod rotates around the axis and rotates towards an anticlockwise direction to a second limiting point.
Figure 10:
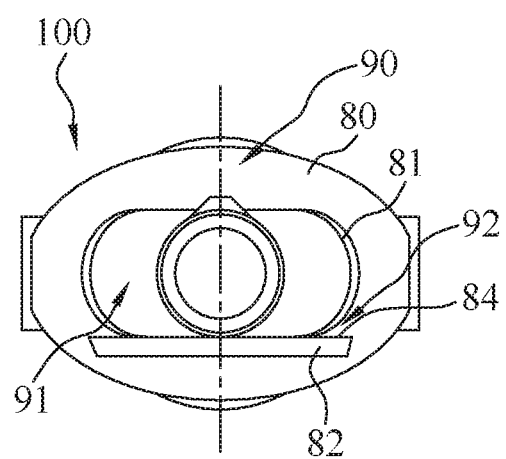
FIG. 10 is a schematic diagram of a limiting element of the ball joint holder with limiting element in accordance with a second preferred embodiment of the present invention.
Figure 11:
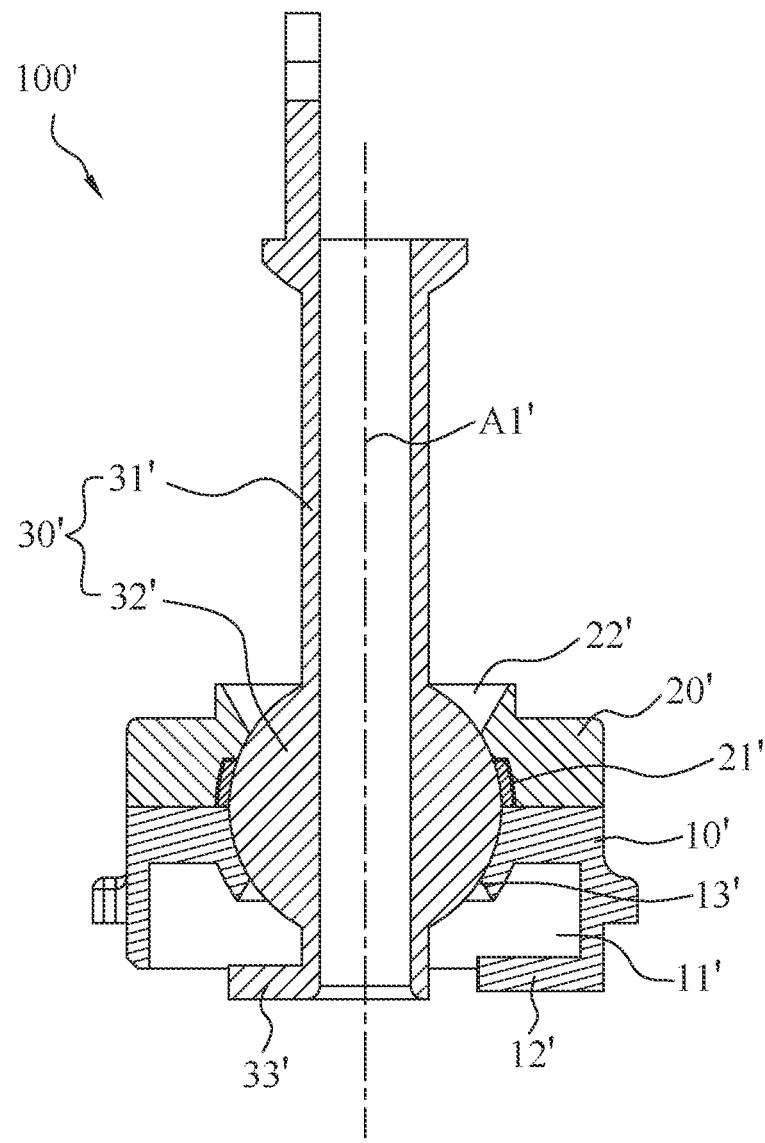
FIG. 11 is a sectional view of a conventional ball joint holder with limiting element in prior art.
Figure 12:
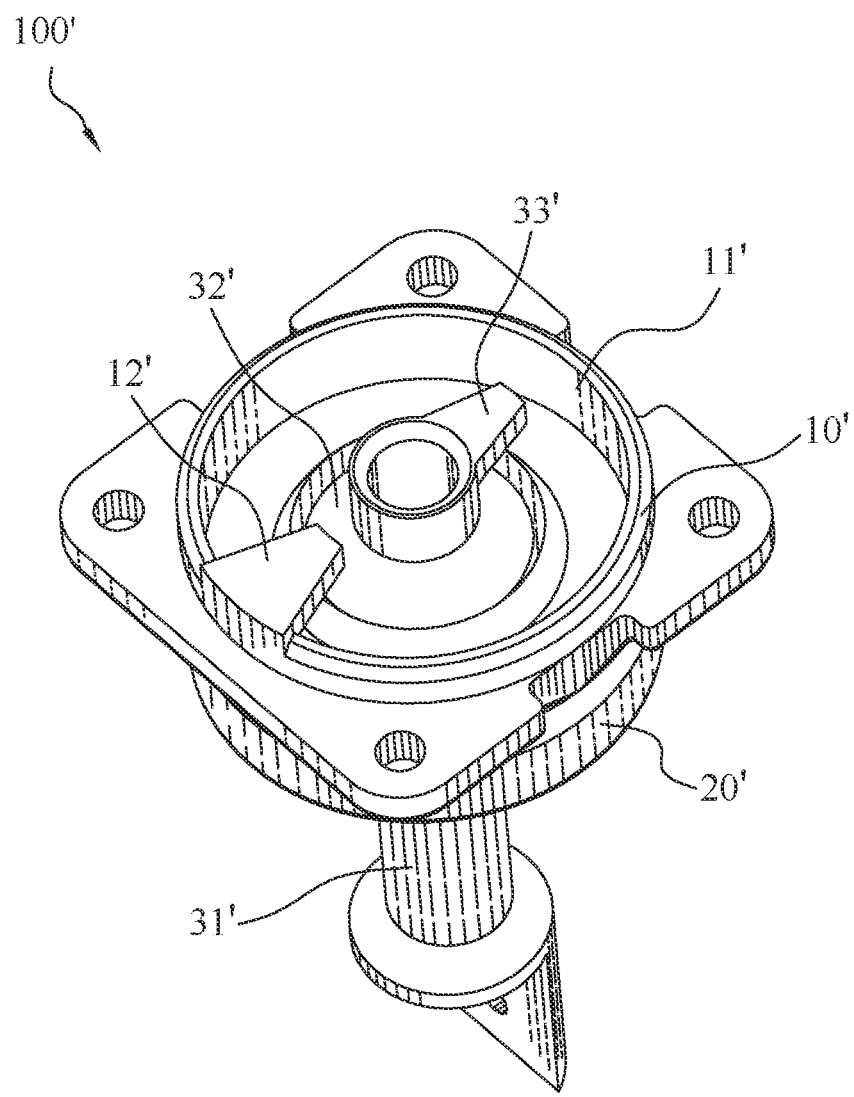
FIG. 12 is a perspective view of the conventional ball joint holder with limiting element of FIG. 11.
Figure 13:
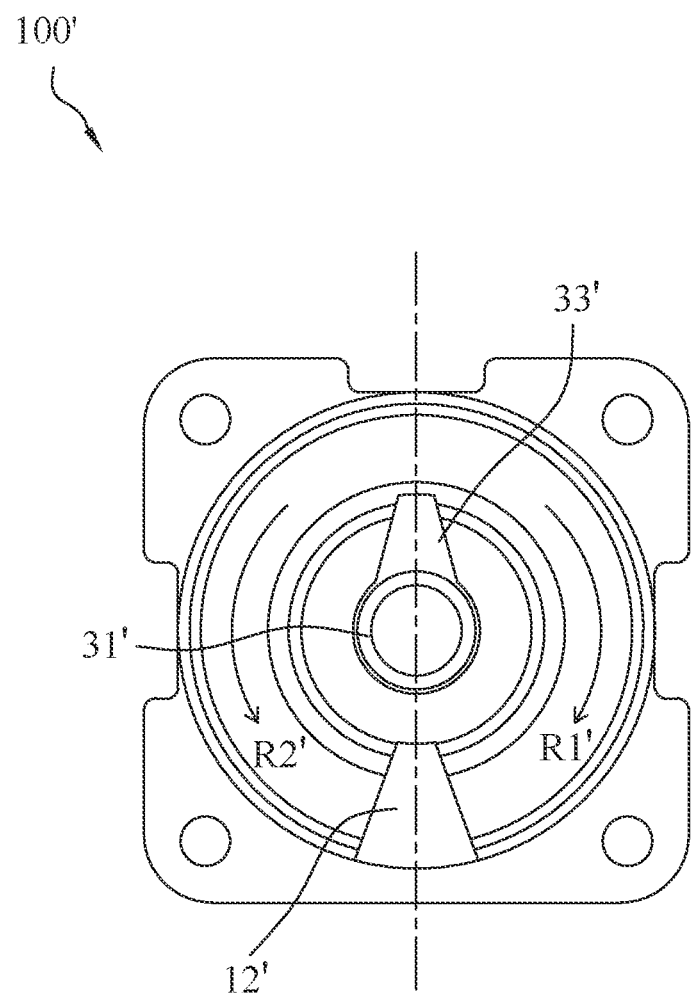
FIG. 13 an upward view of the conventional ball joint holder with limiting element of FIG. 12.
Figure 14:
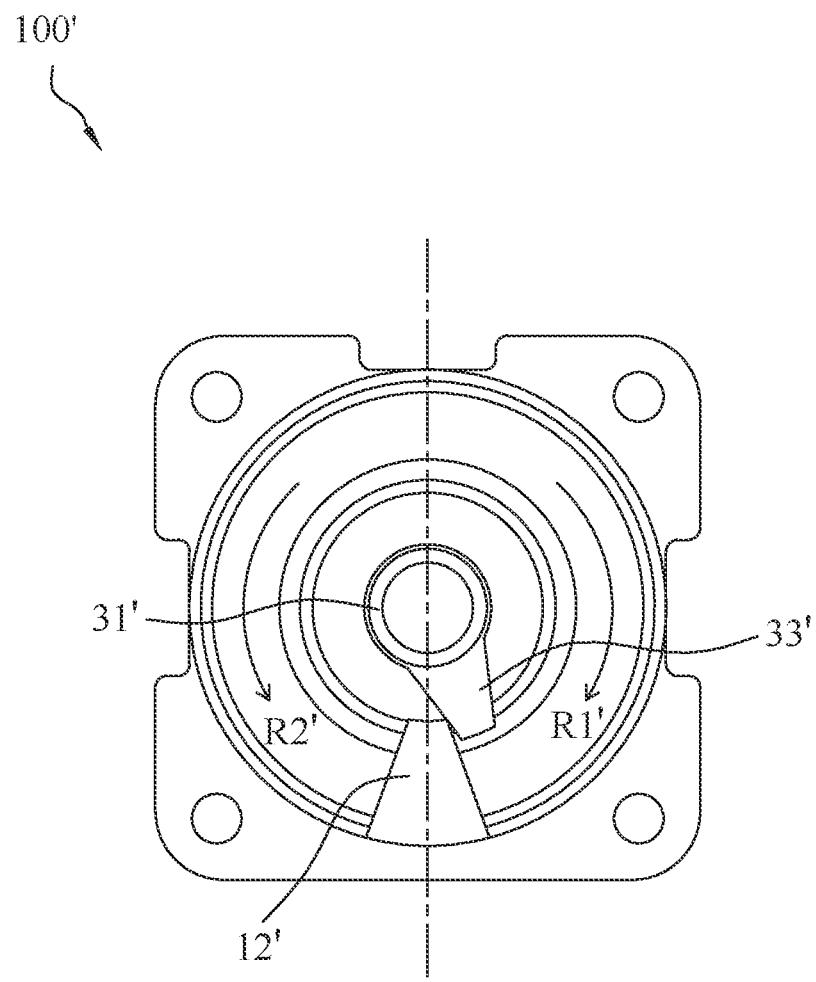
FIG. 14 is a schematic diagram of the conventional ball joint holder with limiting element of FIG. 12, wherein a rotation rod rotates around an axis and rotates towards a clockwise direction until a second limiting block abuts against a first limiting block.
Figure 15:
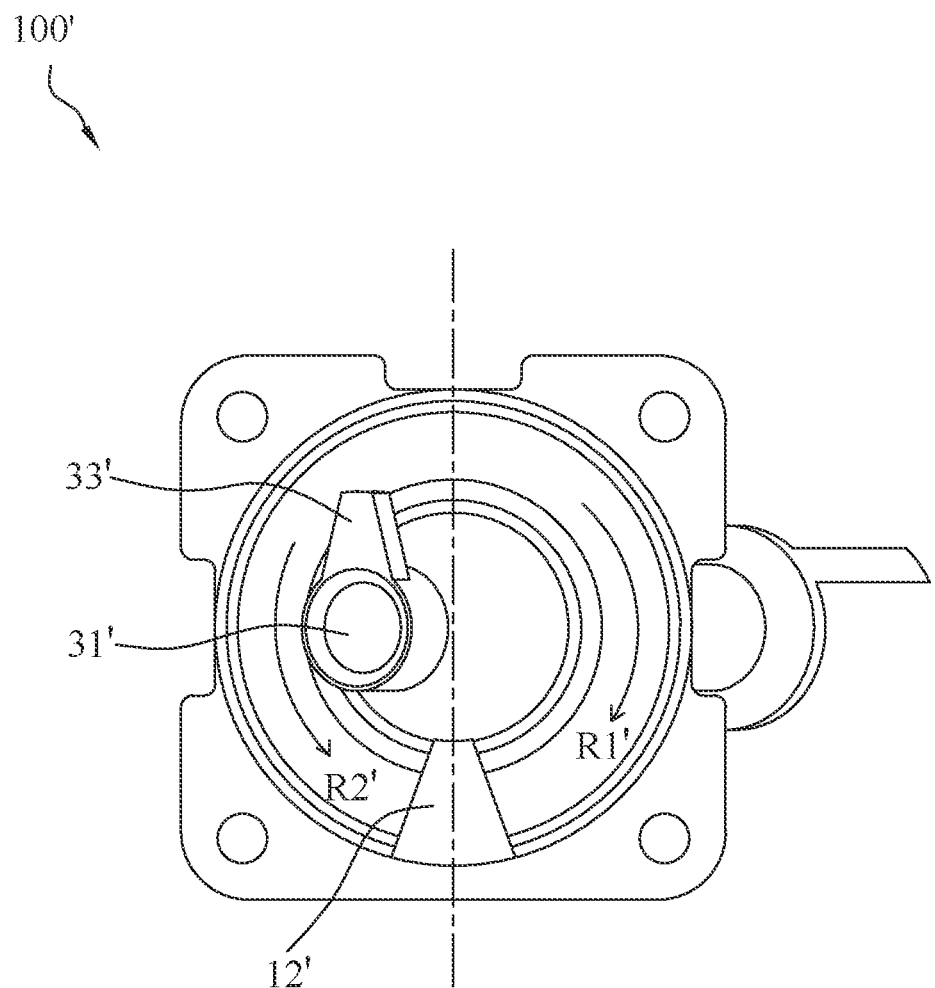
FIG. 15 is a schematic diagram of the conventional ball joint holder with limiting element of FIG. 12, wherein the rotation rod is inclined sideward.

Referring to FIG. 1, FIG. 6 and FIG. 7, the lower base 10 has a base portion 101. The base portion 101 is of a hollow cylinder shape extending up and down. A middle of an outer peripheral surface of the base portion 101 protrudes outward to form an assembling board 11 projecting beyond the outer peripheral surface of the base portion 101. The lower base 10 opens a recess 12 penetrating through a middle of a bottom surface of the lower base 10, and a lower assembling notch 13 penetrating through a middle of a top surface of the lower base 10. The lower assembling notch 13 is corresponding to and communicated with the recess 12. A middle of a lower portion of the base portion 101 is shown as a circular hollow shape to form the circular recess 12 penetrating through a middle of a bottom surface of the base portion 101. A middle of an upper portion of the base portion 101 is shown as a circular hollow shape to form the circular lower assembling notch 13 penetrating through a middle of a top surface of the base portion 101. The lower assembling notch 13 is corresponding to and communicated with the circular recess 12. A diameter of the lower assembling notch 13 gradually becomes smaller from top to bottom, so an upper portion of the diameter of the lower assembling notch 13 is larger than a lower portion of the diameter of the lower assembling notch 13. An inner surface of a sidewall of the lower assembling notch 13 is shown as a spherical surface. A bottom end of the lower assembling notch 13 spreads outward to form a holding groove 18.

The upper portion of the base portion 101 opens a plurality of first assembling holes 14 penetrating through the top surface of the base portion 101. The lower assembling notch 13 is surrounded among the plurality of the first assembling holes 14. Two opposite sides of the base portion 101 open two openings 15 communicated with the recess 12. The lower assembling notch 13 is located between the two openings 15. The two openings 15 penetrate through two opposite sides of a top wall of the recess 12. An inner surface of each side wall of each opening 15 is shown as a plane. Two opposite sides of the top surface of the base portion 101 are recessed downward to form two semicircular locking slots 16 located at outer sides of the two openings 15. The two locking slots 16 are opposite to each other and are located to a top of the assembling board 11. Inner sides of the two locking slots 16 are communicated with the two corresponding openings 15, respectively. Several portions of a peripheral surface of the assembling board 11 are recessed inward to form a plurality of locking grooves 17. Two of the plurality of the locking grooves 17 are communicated with outer sides of the two locking slots 16, respectively.

Referring to FIG. 1, FIG. 4, FIG. 5, FIG. 6 and FIG. 7, the upper base 20 is covered to the lower base 10. The upper base 20 is of a hollow cylinder shape. An outer diameter of the upper base 20 is equal to an outer diameter of the base portion 101 of the lower base 10. Two outer sides of a bottom surface of the upper base 20 protrude downward to form two protruding ears 21 corresponding to the two locking slots 16, respectively. The two protruding ears 21 are assembled in the two locking slots 16, respectively. The two protruding ears 21 open two first pivoting holes 22, respectively. The bottom surface of the upper base 20 open two insertion grooves 23 located to inner sides of the two protruding ears 21, respectively. The two insertion grooves 23 are corresponding to the two openings 15, respectively.

The upper base 20 opens a circular upper assembling notch 24 penetrating through a middle of a bottom surface of the upper base 20. The upper assembling notch 24 is corresponding to the lower assembling notch 13. A diameter of the upper assembling notch 24 gradually becomes larger from top to bottom, so an upper end of the diameter of the upper assembling notch 24 is smaller than a lower end of the diameter of the upper assembling notch 24. An inner surface of a sidewall of the upper assembling notch 24 is shown as a spherical surface.

A middle of a top of the upper assembling notch 24 extends upward to form a circular perforation 25. An inner surface of a sidewall of the perforation 25 is shown as a spherical surface. A diameter of the perforation 25 gradually becomes larger from top to bottom, so an upper end of the diameter of the perforation 25 is smaller than a lower end of the diameter of the perforation 25. The diameter of the perforation 25 is smaller than the diameter of the upper assembling notch 24. A top end of the perforation 25 extends upward and gradually expands outward from bottom to top to form a first receiving groove 28. A middle of a top surface of the upper base 20 protrudes upward to form a ring-shaped protruding wall 26.

A middle of the protruding wall 26 defines a second receiving groove 29 corresponding to the first receiving groove 28. Inner surfaces of the first receiving groove 28 and the second receiving groove 29 are smoothly connected. The first receiving groove 28 and the second receiving groove 29 together define a receiving groove 201. An inner surface of a sidewall of the receiving groove 201 is shown as a funnel-shaped inclined surface. A diameter of the inner surface of the sidewall of the receiving groove 201 gradually becomes larger from bottom to top. The protruding wall 26 opens a plurality of second assembling holes 27 corresponding to the plurality of the first assembling holes 14 separately. Each of the plurality of the fixing elements 30 is locked in one of the plurality of the first assembling holes 14, and one of the plurality of the second assembling holes 27 corresponding to the one of the plurality of the first assembling holes 14, so that the upper base 20 and the lower base 10 are fastened together.

The ball shaft 40 has a cylinder-shaped rotation rod 41 extending up and down, and a ball body 42 fastened around a lower end of the rotation rod 41. The lower end of the rotation rod 41 protrudes outward to form a limiting block 43 located under the ball body 42. A lower end of the ball body 42 is assembled in the lower assembling notch 13. The lower end of the rotation rod 41 projects into the recess 12. An upper end of the ball body 42 is received in the upper assembling notch 24, the perforation 25 and the receiving groove 201, and the upper end of the ball body 42 is received in the middle of the protruding wall 26. An upper end of the rotation rod 41 is received in the perforation 25, and penetrates through the middle of the protruding wall 26 and projects beyond a top surface of the protruding wall 26 of the upper base 20. The protruding wall 26 controls a rotation angle of the ball shaft 40. The upper end of the rotation rod 41 projects beyond the top surface of the upper base 20. The camera device 200 is fastened to the upper end of the rotation rod 41.

Figure 4:
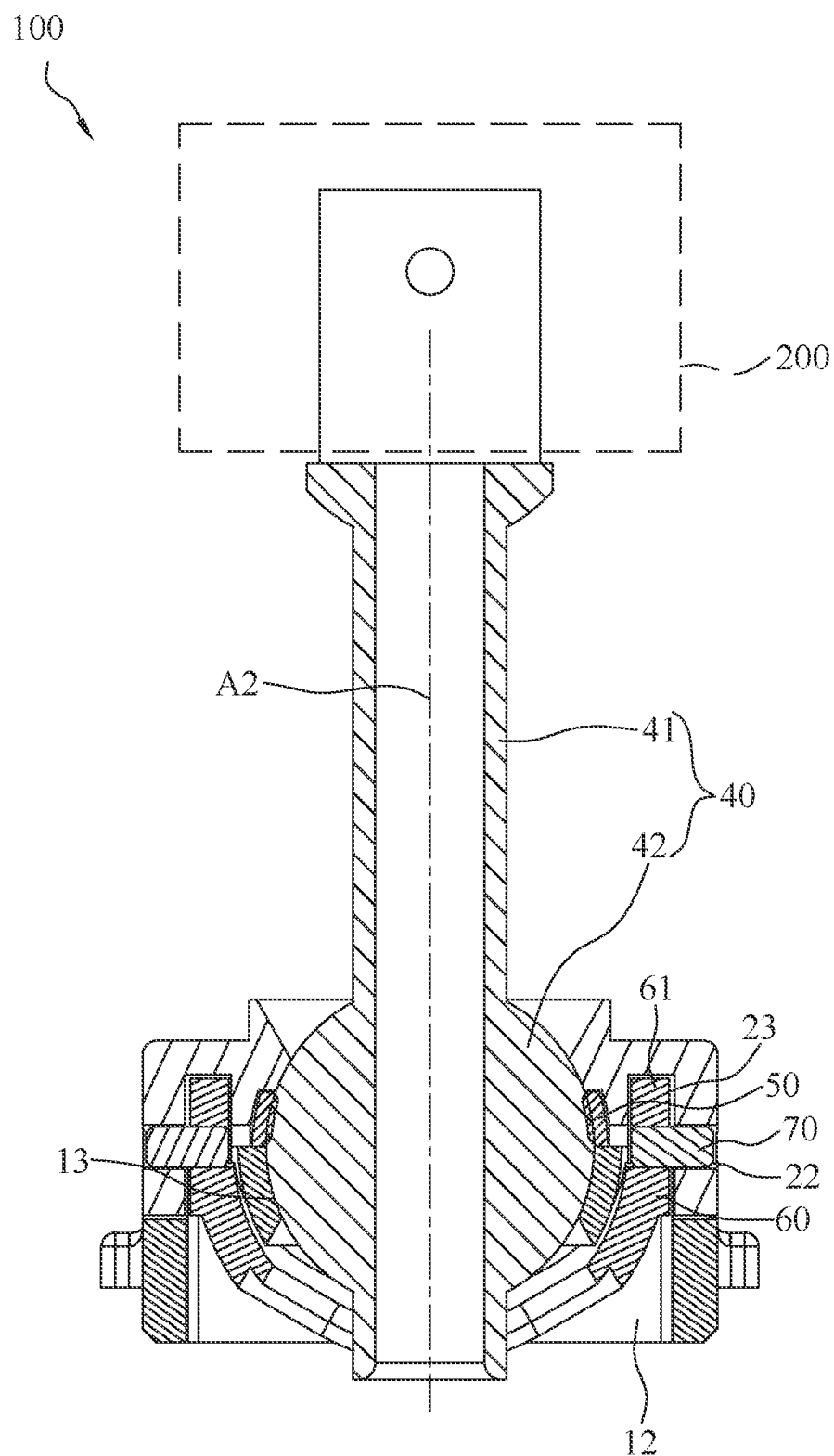
FIG. 4 is a sectional view of the ball joint holder with a limiting element along a line IV-IV of FIG. 3.
Figure 5:
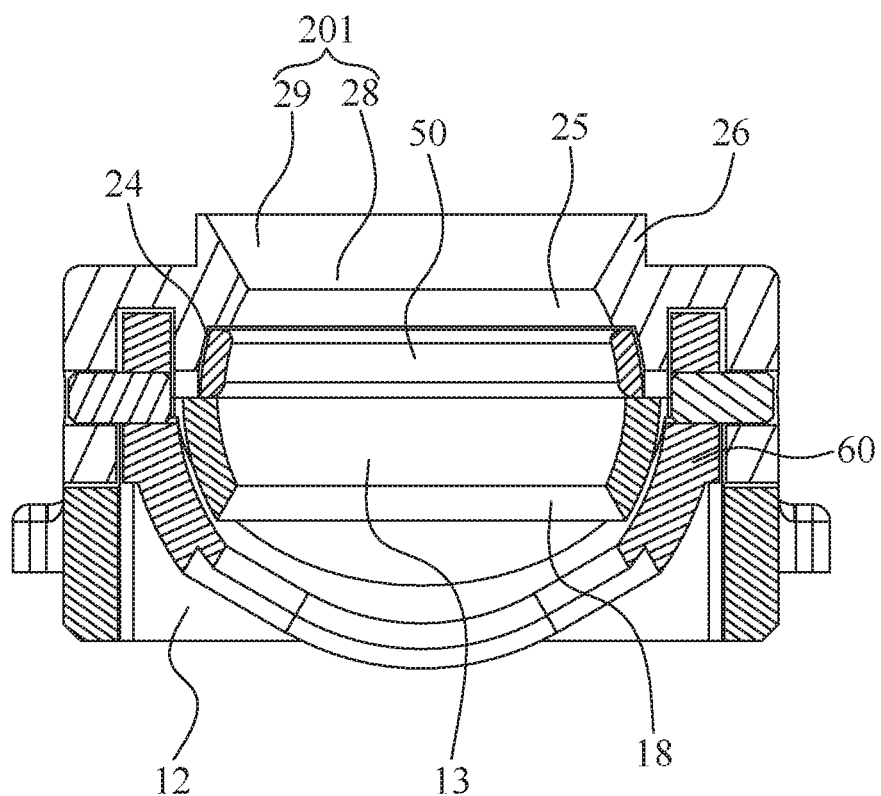
FIG. 5 is a sectional view of the ball joint holder with a limiting element of FIG. 4, wherein a ball shaft is omitted.

Referring to FIG. 4 to FIG. 6, the wear-resisting element 50 is of a ring shape. An upper end of an inner diameter of the wear-resisting element 50 is smaller than a lower end of the inner diameter of the wear-resisting element 50. The wear-resisting element 50 is clamped between the inner surface of the sidewall of the upper assembling notch 24 and an outer peripheral surface of the ball body 42. The wear-resisting element 50 is used to provide a twisting force for the ball shaft 40.

Referring to FIG. 1, FIG. 4, FIG. 5, FIG. 6 and FIG. 7, the first limiting element 60 is of an arc shape. A mouth 601 of the first limiting element 60 faces upward. A middle of the first limiting element 60 is wider than two opposite ends of the first limiting element 60. Two sides of the first limiting element 60 are connected between the two ends of the first limiting element 60 and spaced from each other. The first limiting element 60 is received in the recess 12. The two ends of the first limiting element 60 are pivotally connected with the lower base 10 and the upper base 20, and the first limiting element 60 is capable of rotating forward and backward. Specifically, the two opposite ends of the first limiting element 60 are fastened with two lying cylinder-shaped pivoting portions 61, respectively. The two pivoting portions 61 open two second pivoting holes 62, respectively. Lower sides of the two pivoting portions 61 are received in the two corresponding openings 15, respectively. Upper sides of the two pivoting portions 61 are received in the two corresponding insertion grooves 23, respectively. The two first pivoting holes 22 are corresponding to and communicated with the two second pivoting holes 62 of the two pivoting portions 61, respectively. Each of the two bolts 70 is inserted into one of the two first pivoting holes 22 and one of the two second pivoting holes 62 corresponding to the one of the two first pivoting holes 22. The first limiting element 60 rotates forward and backward around the two bolts 70.

Referring to FIG. 2, FIG. 3, FIG. 5, FIG. 6 and FIG. 7, a middle of the first limiting element 60 opens a long and narrow first limiting groove 63 extending towards the two opposite ends of the first limiting element 60, and penetrating through a top surface and a bottom surface of the first limiting element 60. The first limiting groove 63 is of an arc shape and is corresponding to the lower assembling notch 13. One of inner surfaces of a front wall and a rear wall of the first limiting groove 63 is a plane. The one of the inner surfaces of the front wall and the rear wall of the first limiting groove 63 is defined as a first limiting surface 64. In the preferred embodiment, the inner surface of the front wall of the first limiting groove 63 is defined as the first limiting surface 64. The first limiting surface 64 is the plane. The lower end of the rotation rod 41 and the limiting block 43 are received in the first limiting groove 63. The first limiting element 60 is capable of rotating together with the ball shaft 40. The limiting block 43 is located to a position capable of being corresponding to the first limiting surface 64. The limiting block 43 is capable of facing to and abutting against the first limiting surface 64. A surface of the limiting block 43 is capable of being substantially parallel with the first limiting surface 64.

Referring to FIG. 2, FIG. 3, FIG. 6 and FIG. 7, in the first preferred embodiment, the first limiting groove 63 includes a long and narrow first sliding groove 631 and a long and narrow second sliding groove 632. The first sliding groove 631 is opened in one surface of the first limiting element 60. The first sliding groove 631 is opened in a middle of a bottom surface of the first limiting element 60 and extended towards the two opposite ends of the first limiting element 60. One of inner surfaces of a front wall and a rear wall of the first sliding groove 631 is a plane. The one of the inner surfaces of the front wall and the rear wall of the first sliding groove 631 is defined as a lower end of the first limiting surface 64. In the preferred embodiment, the inner surface of the front wall of the first sliding groove 631 is defined as the lower end of the first limiting surface 64. Two end walls of the first sliding groove 631 are of arc shapes from a top view. A middle of one side of a top wall of the first sliding groove 631 opens a second sliding groove 632 penetrating through the top wall of the first sliding groove 631. An upper end of the first limiting surface 64 is flush with the lower end of the first limiting surface 64.

An occupying area of the second sliding groove 632 is smaller than an occupying area of the first sliding groove 631 and penetrates through the other surface of the first limiting element 60. A shape of the first sliding groove 631 is substantially the same as a shape of the second sliding groove 632. Specifically, the second sliding groove 632 penetrates through a top surface of the first limiting element 60. One of the inner surfaces of the front wall and the rear wall of the second sliding groove 632 is the upper end of the first limiting surface 64. In the preferred embodiment, the inner surface of the front wall of the second sliding groove 632 is the upper end of the first limiting surface 64. The inner surface of the front wall of the second sliding groove 632 is flush with the inner surface of the front wall of the first sliding groove 631. Two ends of the lower end of the first limiting surface 64 project beyond two ends of an upper portion of the inner surface of the front wall of the first limiting groove 63 and two ends of the inner surface of the rear wall of the first limiting groove 63. The limiting block 43 is disposed in the first limiting groove 63. In the preferred embodiment, the limiting block 43 is disposed in the first sliding groove 631. The limiting block 43 is capable of being opposite to the rear wall of the first sliding groove 631.

Referring to FIG. 1 to FIG. 9, an operation principle of the ball joint holder with limiting element 100 is described as follows. Two opposite ends of the first limiting groove 63 are defined as a left end and a right end. When the camera device 200 drives the upper end of the rotation rod 41 to be inclined towards the left end or the right end of the first limiting groove 63, the lower end of the rotation rod 41 pivots the ball body 42 to slide towards a reverse direction opposite to the left end or the right end of the first limiting groove 63 along the first limiting groove 63. The lower end of the rotation rod 41 slides between two opposite ends of a side wall of the first limiting groove 63. One side surface of the limiting block 43 abuts against and is limited by the first limiting surface 64.

When the camera device 200 drives the upper end of the rotation rod 41 to be inclined towards other directions of the first limiting groove 63 different from the left end and the right end of the first limiting groove 63, the lower end of the rotation rod 41 pivots the ball body 42 to be inclined towards a reverse direction opposite to one of the other directions and pushes against the side wall of the first limiting groove 63 to drive the first limiting element 60 to rotate.

When the camera device 200 rotates towards a clockwise direction R1 or an anticlockwise direction R2, the rotation rod 41 will pivot an axis A2 of the rotation rod 41 to rotate towards the clockwise direction R1 or the anticlockwise direction R2 to rotate, a limiting point of the rotation rod 41 rotating towards the clockwise direction R1 or the anticlockwise direction R2 is a point of the limiting block 43 abutting against the first limiting surface 64.

In the first preferred embodiment, the rear wall, a left wall and a right wall of the first sliding groove 631 are spaced preset distances from the corresponding rear wall, a corresponding left wall and a corresponding right wall of the second sliding groove 632 separately. When the upper end of the rotation rod 41 is inclined towards the left end or the right end of the first sliding groove 631, the lower end of the rotation rod 41 pivots the ball body 42 to slide towards the reverse direction opposite to the left end or the right end of the first sliding groove 631 along the first sliding groove 631. The lower end of the rotation rod 41 slides between the two opposite ends of the side wall of the first limiting groove 63. The one side surface of the limiting block 43 abuts against and is limited by the first limiting surface 64.

When the upper end of the rotation rod 41 is inclined towards the other directions of the first limiting groove 63 different from the left end and the right end of the first limiting groove 63, the lower end of the rotation rod 41 pivots the ball body 42 to be inclined towards the reverse direction opposite to the one of the other directions and pushes against the corresponding front wall and the corresponding rear wall of the second sliding groove 632 to drive the first limiting element 60 to rotate.

The rotation rod 41 pivots the axis A2 of the rotation rod 41 to rotate towards the clockwise direction R1 or the anticlockwise direction R2, the limiting point of the rotation rod 41 rotating towards the clockwise direction R1 or the anticlockwise direction R2 is the point of the limiting block 43 abutting against the inner surface of the front wall of the first limiting groove 63, namely the first limiting surface 64.

Referring to FIG. 2 to FIG. 10, a ball joint holder with limiting element 100 in accordance with a second preferred embodiment of the present invention is shown. Differences between the ball joint holder with limiting element 100 in accordance with the first preferred embodiment and the ball joint holder with limiting element 100 in accordance with the second preferred embodiment are described as follows. In the second preferred embodiment, the limiting element 90 is a second limiting element 80. A surface of the second limiting element 80 protrudes outward to form a blocking block 82. A middle of the second limiting element 80 defines a second limiting groove 81. The blocking block 82 is disposed in front of or behind the second limiting groove 81. Two opposite ends of the blocking block 82 are defined as a left end and a right end of the blocking block 82, respectively. The left end and the right end of the blocking block 82 project beyond two ends of a front wall of the second limiting groove 81 and two ends of a rear wall of the second limiting groove 81. A corresponding inner side surface of the blocking block 82 is flush with an inner surface of a side wall of the second limiting groove 81. The inner surface of the side wall of the second limiting groove 81 and the corresponding inner side surface of the blocking block 82 are defined as a second limiting surface 84.

The limiting element 90 is received in the received in the recess 12. Two opposite ends of the limiting element 90 are pivotally connected with the lower base 10 and the upper base 20, and the limiting element 90 is capable of rotating forward and backward. The limiting element 90 opens a limiting groove 91 extending towards the two opposite ends of the limiting element 90. The limiting groove 91 is corresponding to the lower assembling notch 13. One of inner surfaces of a front wall and a rear wall of the limiting groove 91 is a plane and is defined as a limiting surface 92. Two ends of a lower end of the limiting surface 92 project beyond two ends of an upper end of the limiting surface 92 and two ends of an inner surface of a rear wall of the limiting groove 91. The lower end of the rotation rod 41 and the limiting block 43 are received in the limiting groove 91. The limiting element 90 is capable of rotating together with the ball shaft 40. The limiting block 43 is capable of facing to and abutting against the limiting surface 92.

When the upper end of the rotation rod 41 is inclined towards a left end or a right end of the limiting groove 91, the lower end of the rotation rod 41 will slide towards a reverse direction opposite to the left end or the right end of the limiting groove 91 in the limiting groove 91, when the camera device 200 drives the upper end of the rotation rod 41 to be inclined towards the other directions of the limiting groove 91 different from the left end and the right end of the limiting groove 91, the limiting element 90 is driven to rotate, so that the rotation rod 41 is capable of proceeding an effective inclination in an arbitrary position of which an angle is within 360 degrees. In addition, when the rotation rod 41 is inclined towards different angles or different positions, the limiting element 90 rotates along with the rotation rod 41, the limiting surface 92 and the limiting block 43 keep in opposite positions, a maximum rotation angle of the rotation rod 41 rotating towards the clockwise direction R1 or the anticlockwise direction R2 around the axis A2 is capable of being set to a preset constant angle.

As described above, the ball joint holder with limiting element 100 is equipped with the limiting element 90, the limiting element 90 opens the limiting groove 91 extending towards the two opposite ends of the limiting element 90, and the one of the inner surfaces of the front wall and the rear wall of the limiting groove 91 is the plane and is defined as the limiting surface 92, the two ends of the lower end of the limiting surface 92 project beyond the two ends of the upper end of the limiting surface 92 and the two ends of the inner surface of the rear wall of the limiting groove 91, when the upper end of the rotation rod 41 is inclined towards the left end or the right end of the limiting groove 91, the lower end of the rotation rod 41 will slide towards the reverse direction opposite to the left end or the right end of the limiting groove 91 in the limiting groove 91, when the camera device 200 drives the upper end of the rotation rod 41 to be inclined towards the other directions of the limiting groove 91 different from the left end and the right end of the limiting groove 91, the limiting element 90 is driven to rotate, so that the rotation rod 41 is capable of proceeding the effective inclination in the arbitrary position of which the angle is within 360 degrees. In addition, when the rotation rod 41 is inclined towards the different angles or the different positions, the limiting element 90 rotates along with the rotation rod 41, the limiting surface 92 and the limiting block 43 keep in the opposite positions, the maximum rotation angle of the rotation rod 41 rotating towards the clockwise direction R1 or the anticlockwise direction R2 around the axis A2 is capable of being set to the preset constant angle for satisfying the usage needs of the users.

What is claimed is:

1. A ball joint holder with a limiting element, comprising:
   a lower base opening a recess penetrating through a middle of a bottom surface of the lower base, and a lower assembling notch penetrating through a middle of a top surface of the lower base, the lower assembling notch being corresponding to and communicated with the recess;
   an upper base covered to the lower base, the upper base opening an upper assembling notch penetrating through a middle of a bottom surface of the upper base, the upper assembling notch being corresponding to the lower assembling notch, a top of the upper assembling notch extending upward to form a perforation;
   a ball shaft having a rotation rod extending up and down, and a ball body located around a lower end of the rotation rod, the lower end of the rotation rod protruding outward to form a limiting block, a lower end of the ball body being assembled in the lower assembling notch, the lower end of the rotation rod projecting into the recess, an upper end of the ball body being received in the upper assembling notch, an upper end of the rotation rod being received in the perforation and projecting beyond a top surface of the upper base; and
   a limiting element received in the recess, two opposite ends of the limiting element being pivotally connected with the lower base and the upper base, and the limiting element being capable of rotating forward and backward, the limiting element opening a limiting groove extending towards the two opposite ends of the limiting element, the limiting groove being corresponding to the lower assembling notch, one of inner surfaces of a front wall and a rear wall of the limiting groove being a plane and being defined as a limiting surface, the lower end of the rotation rod and the limiting block being received in the limiting groove, the limiting element being capable of rotating together with the ball shaft, the limiting block being capable of facing to and abutting against the limiting surface.

2. The ball joint holder with a limiting element as claimed in claim 1, wherein the limiting element is a first limiting element of an arc shape, a mouth of the first limiting element faces upward, a middle of the first limiting element is wider than two opposite ends of the first limiting element.

3. The ball joint holder with a limiting element as claimed in claim 2, wherein a middle of the first limiting element opens a first limiting groove extending towards the two opposite ends of the first limiting element, and penetrating through a top surface and a bottom surface of the first limiting element, the lower end of the rotation rod and the limiting block are received in the first limiting groove.

4. The ball joint holder with a limiting element as claimed in claim 3, wherein the first limiting groove includes a first sliding groove opened in one surface of the first limiting element and extended towards the two opposite ends of the first limiting element, one of inner surfaces of a front wall and a rear wall of the first sliding groove is a plane, one side of a top wall of the first sliding groove opens a second sliding groove penetrating through the top wall of the first sliding groove, an occupying area of the second sliding groove is smaller than an occupying area of the first sliding groove and penetrates through the other surface of the first limiting element, the one of the inner surfaces of the front wall and the rear wall of the first limiting groove is defined as a first limiting surface, the limiting block is disposed in the first sliding groove.

5. The ball joint holder with a limiting element as claimed in claim 4, wherein two ends of a lower end of the first limiting surface project beyond two ends of an upper portion of an inner surface of the front wall of the first limiting groove and two ends of the inner surface of the rear wall of the first limiting groove.

6. The ball joint holder with a limiting element as claimed in claim 2, wherein the lower base has a base portion, two opposite sides of the base portion open two openings communicated with the recess, the lower assembling notch is located between the two openings, two opposite sides of a top surface of the base portion are recessed downward to form two locking slots located at outer sides of the two openings, inner sides of the two locking slots are communicated with the two corresponding openings, respectively, two outer sides of a bottom surface of the upper base protrude downward to form two protruding ears corresponding to the two locking slots, respectively, the two protruding ears are assembled in the two locking slots, respectively, the bottom surface of the upper base open two insertion grooves located to inner sides of the two protruding ears, respectively, the two insertion grooves are corresponding to the two openings, respectively, the two opposite ends of the first limiting element are fastened with two pivoting portions, respectively, lower sides of the two pivoting portions are received in the two corresponding openings, respectively, upper sides of the two pivoting portions are received in the two corresponding insertion grooves, respectively.

7. The ball joint holder with a limiting element as claimed in claim 6, further comprising two bolts, the two protruding ears opening two first pivoting holes, respectively, the two pivoting portions opening two second pivoting holes, respectively, the two first pivoting holes are corresponding to and communicated with the two second pivoting holes, respectively, each of the two bolts being inserted into one of the two first pivoting holes and one of the two second pivoting holes corresponding to the one of the two first pivoting holes.

8. The ball joint holder with a limiting element as claimed in claim 6, wherein a middle of an outer peripheral surface of the base portion protrudes outward to form an assembling board projecting beyond the outer peripheral surface of the base portion, several portions of a peripheral surface of the assembling board are recessed inward to form a plurality of locking grooves, two of the plurality of the locking grooves are communicated with outer sides of the two locking slots, respectively.

9. The ball joint holder with a limiting element as claimed in claim 1, wherein the limiting element is a second limiting element, a surface of the second limiting element protrudes outward to form a blocking block, a middle of the second limiting element defines a second limiting groove, the blocking block is disposed in front of or behind the second limiting groove, a corresponding inner side surface of the blocking block is flush with an inner surface of a side wall of the second limiting groove, the inner surface of the side wall of the second limiting groove and the corresponding inner side surface of the blocking block are defined as a second limiting surface.

10. The ball joint holder with a limiting element as claimed in claim 1, wherein a middle of a top surface of the upper base protrudes upward to form a ring-shaped protruding wall, a top end of the perforation extends upward and gradually expands outward from bottom to top to form a first receiving groove, a middle of the protruding wall defines a second receiving groove corresponding to the first receiving groove, the upper end of the rotation rod penetrates through the middle of the protruding wall and projects beyond a top surface of the protruding wall, the protruding wall controls a rotation angle of the ball shaft.

11. The ball joint holder with a limiting element as claimed in claim 10, wherein the first receiving groove and the second receiving groove together define a receiving groove, an inner surface of a sidewall of the receiving groove is shown as a funnel-shaped inclined surface.

12. The ball joint holder with a limiting element as claimed in claim 1, wherein an upper portion of a diameter of the lower assembling notch is larger than a lower portion of the diameter of the lower assembling notch, an inner surface of a sidewall of the lower assembling notch is shown as a spherical surface, an upper end of a diameter of the upper assembling notch is smaller than a lower end of the diameter of the upper assembling notch, an inner surface of a sidewall of the upper assembling notch is shown as a spherical surface, an upper end of a diameter of the perforation is smaller than a lower end of the diameter of the perforation, an inner surface of the perforation is shown as a spherical surface.

13. The ball joint holder with a limiting element as claimed in claim 1, further comprising a wear-resisting element clamped between an inner surface of a sidewall of the upper assembling notch and an outer peripheral surface of the ball body.

14. The ball joint holder with a limiting element as claimed in claim 13, wherein the wear-resisting element is of a ring shape, an upper end of an inner diameter of the wear-resisting element is smaller than a lower end of the inner diameter of the wear-resisting element.

15. The ball joint holder with a limiting element as claimed in claim 1, wherein the rotation rod is capable of proceeding an effective inclination in an arbitrary position of which an angle is within 360 degrees.

* * * * *